ABSTRACT OF THE DISCLOSURE

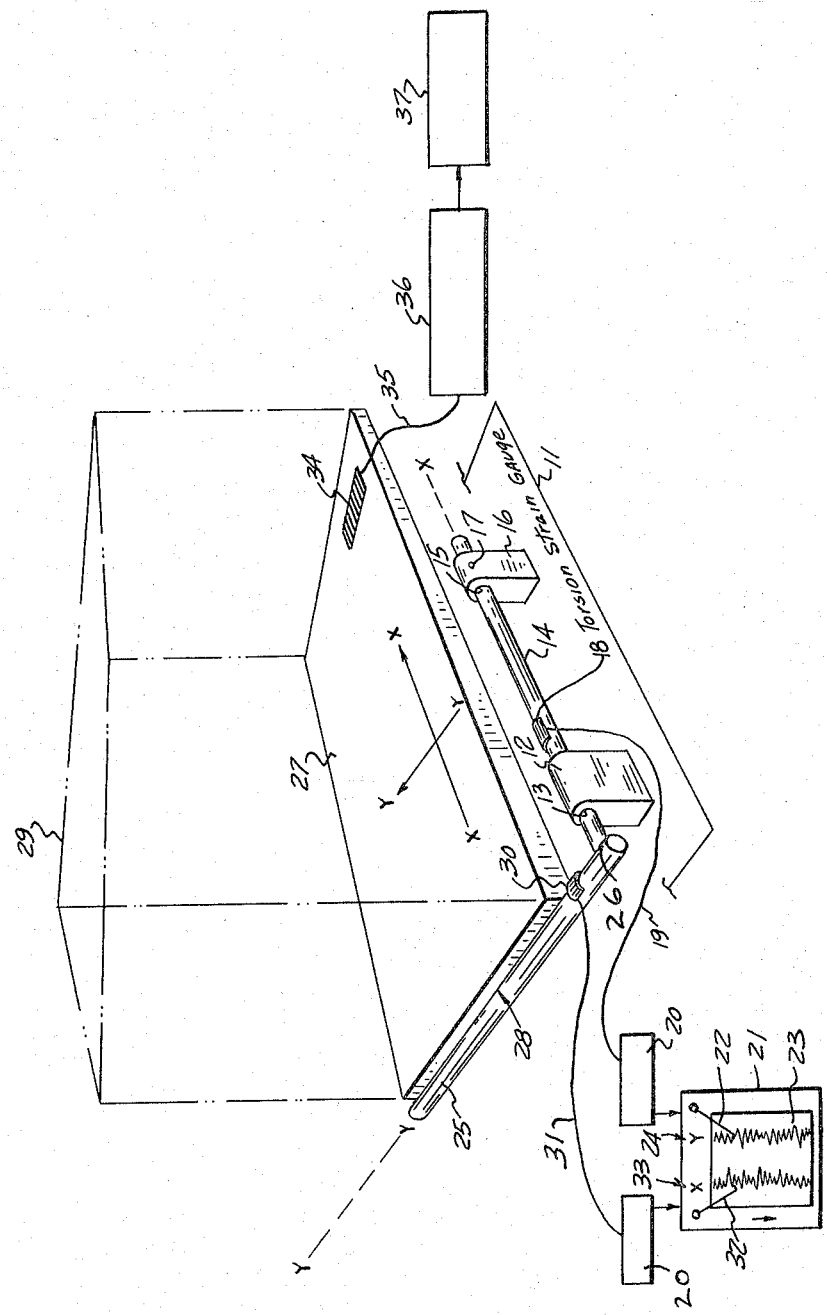
Feb. 20, 1968    S. W. GREENBERG    3,370,296
ANIMAL ACTIVITY RECORDER
Filed Feb. 23, 1967
INVENTOR
SAMUEL W. GREENBERG 3,370,296
ANIMAL ACTIVITY RECORDER
Samuel W. Greenberg 19225 Woodbine,
Detroit, Mich. 48219
Filed Feb. 23, 1967, Ser. No. 618,112
3 Claims. (Cl. 346—14)

The present animal activity recorder incorporates a cage having a floor mounted on one of a pair of right angular related inter-connected torsion bars the other of which is mounted and anchored in such a manner that movement of the animal over the cage floor with respect to X and Y coordinates will produce various torsional stresses in the said torsion bars which mount strain gauges thus converting the animal's movements to electrical analogues controlling a chart recorder and with the floor of the cage serving as a variable length lever so that as the animal moves further from the respective torsion bar axes the torque applied to the bar increases, causing a corresponding change in the respective strain gauges thus registering the animal's position as a continuous variable with respect to a recording device.

---

The present invention relates to an animal activity recorder for designating the nature and extent of physical movements of the animal with respect to right angularly related X and Y coordinate axes of the floor of an animal enclosure.

It is an object of the present invention to provide a novel and simplified animal activity recorder and wherein a cage including a floor so mounted with respect to a pair of right angularly related torsion bars so that with the floor of the cage acting as a variable length lever movement of an animal within the cage upon said floor depending on the direction of his movement with respect to the right angularly related X and Y coordinates will cause respectively a different amount of torsional strain upon the said torsion bars which strain is transmitted through respective strain gauges thereon and through suitable amplifying means for operating a multi-channel chart recorder to thus obtain upon said recorder graph movement of the animal within said cage.

It is another object of the present invention to provide a capacitance proximity detector or other type of detector which would correspond to a feeding or watering trough and associated with a counter or other recording device and with electrical connections including oscillator and relay to indicate the number of times that the animal goes into the vicinity of the said detector and at what periods during the entire cycle this occurs.

These and other objects will be seen from the following specification and claims in conjunction with the appended drawing in which:

The figure is a schematic perspective view of the present animal activity recorder with the electrical connections diagrammatically shown.

It will be understood that the above drawing illustrates merely a preferred embodiment of the invention and that other embodiments are contemplated within the scope of the claims hereafter set forth.

Referring to the drawing the present animal activity recorder requires the use of a base 11 or other suitable bed or support upon which is mounted the upright bearing block 12 apertured at 13.

The Y coordinate torsion bar 14 is supportably journaled adjacent one end through the bearing block 12 and adjacent its other end extends through aperture 15 of anchor block 16 mounted upon base 11 and is fixedly secured thereto as by set screw or other fastener 17.

The torsion strain gauge 18 is fixedly secured to the torsion bar 14 towards and adjacent its free end and by suitable electrical connections or conduit 19 is connected to the two channel chart recorder 21 with a suitable strain gauge amplifier 20 interposed.

The chart recorder includes a marker arm 22 pivotally mounted upon the recorder and under power control for reciprocal movements with respect to the continuously movable graph 23 which moves relative to the indicia Y for designating movements of the animal relative to the Y coordinate, said Y coordinate being shown as indicia 24 upon the recorder 21.

The X coordinate torsion bar 25 is coplanar with torsion bar 14 and adjacent one end is anchored as at 26 to the one free end of said torsion bar 14.

The animal activity enclosure 29 includes a cage floor 27 which is secured along one end as at 28 to one side portion of the X coordinate torsion bar 25. Torsion bar strain gauge 30 is adhered or otherwise fixedly secured to X coordinate torsion bar 25 and through suitable electrical connections 31 is connected to the chart recorder 21 and employing strain gauge amplifier 20 to said recorder and with respect to the power operated or reciprocal marker arm 32 on said chart recorder which provides markings upon graph 23 with respect to the indicia X as at 33 designating movements of the animal upon the cage floor with respect to the X coordinate axis.

The present recorder which is of a conventional construction operates upon a variable voltage. The variable strain gauge outputs from the respective strain gauges 18 and 30 are directed through the amplifier 20 and respectively directed to operate the power reciprocated marking arms 22 and 32 respectively of the chart recorder 21 in a conventional manner to thus provide analogues corresponding to movements of the animal within the cage with respect to said axes which can be transmitted and recorded upon standard chart recording equipment such as the recorder 21 to thus give a visible indication of the full movement of the animal over a predetermined period on said cage floor and with respect to said coordinate axes X and Y.

Thus the floor 27 of the cage is so mounted with respect to the torsion bars 25 and 14 as to act as a variable length lever solidly connected to the right angularly related torsion bars corresponding to the X and Y axes of the said cage floor. As the animal moves further from a torsion bar axis the torque applied to the bar increases causing a corresponding change in the respective strain gauge in registering the animal's position as a continuous variable upon the recorder 21.

The respective output from the strain gauge 18 and 30 is amplified as to voltage so that the variable voltage produced controls the function and operation of the chart recorder and particularly the reciprocal movements as to amplitude of the markers 22 and 32 respectively for marking X and Y coordinate indications upon the graph 23 of said recorder.

A proximity detector 34 referred to as a capacitance proximity detector, though an impedance type of detector could be employed which is positioned upon floor 27 at a location which may correspond to a watering or a feeding station or to both with the capacitance being modified due to the relative position of an animal moving upon the floor so that as the animal moves into the vicinity of the detector 34 the capacitance thereof changes to produce a change of frequency in the oscillator and relay assembly 36 connected by line 35 and to thus activate the event counter 37 for the indicating of the number of times the animal approaches the feeding or watering station and to give an accurate count of such events. Instead of the counter 37 as shown in the drawing such counter may be incorporated into the recorder assembly 21 providing a third channel to indicate not only the number of times the animal approaches the watering or feeding area but also the period during the cycle when this occurs.

The nature of the recorded traces on the recorder will provide additional information as to frequency and intensity of the animal's activity, i.e. by the number of peaks and their spacing.

The present invention contemplates usage in other fields. For example, the platform may be used to respond to the application of variably located forces, with the recorder indicating the amount and location of the forces as applied to the platform over a period of time.

Having described my invention reference should now be had to the following claims.

I claim:
1. An animal activity recorder comprising a base;
an apertured bearing block on said base;
an apertured anchor block on said base aligned with said bearing block;
a Y coordinate torsion bar adjacent one end journaled through said bearing block and adjacent its other end mounted on and secured to said anchor block;
an X coordinate torsion bar at right angles to and coplaner with said Y coordinate torsion bar and adjacent one end secured to said one end of said Y coordinate torsion bar;
an animal cage including a floor with the floor at one end secured to and coplanar with said X coordinate torsion bar;
torsion strain gauges secured respectively to each of said torsion bars;
a multi-channel chart recorder designating X and Y coordinate indicia with respect to a movable graph;
and separately controlled movable markers corresponding to said indicia;
and electrical connections respectively between said strain gauges and said recorder markers including amplifying means whereby movements of a laboratory animal over said cage floor relative to said coordinates are converted to electrical analogues to said recorder;
said cage floor serving as a variable length lever, said animal's position on said cage floor registering as a continuous variable.

2. In the animal activity recorder of claim 1
a proximity detector corresponding to a feeding or water station on said cage floor;
an event counter;
and electrical connections between said detector and counter including an oscillator and relay to indicate the number of times the animal was in the specific vicinity of said detector and at what times during the recording cycle.

3. In the animal activity recorder of claim 1
a proximity detector corresponding to a feeding or watering station on said cage floor;
an event counter on said recorder;
and electrical connections between said counter and said detector including an oscillator and relay to indicate on said recorder counter the number of times the animal was in the specific vicinity of said detector and at what times during the recording cycle.

References Cited
UNITED STATES PATENTS

| | | | |
|---|---|---|---|
| 3,063,630 | 11/1962 | Cromley et al. | 235—92 |
| 3,090,226 | 5/1963 | Corti et al. | 73—141 |
| 3,103,984 | 9/1963 | Ellis et al. | 177—211 |
| 3,340,726 | 9/1967 | Armstrong et al. | 73—133 X |

RICHARD B. WILKINSON, *Primary Examiner.*

J. W. HARTARY, *Assistant Examiner.*